Patented Apr. 1, 1952

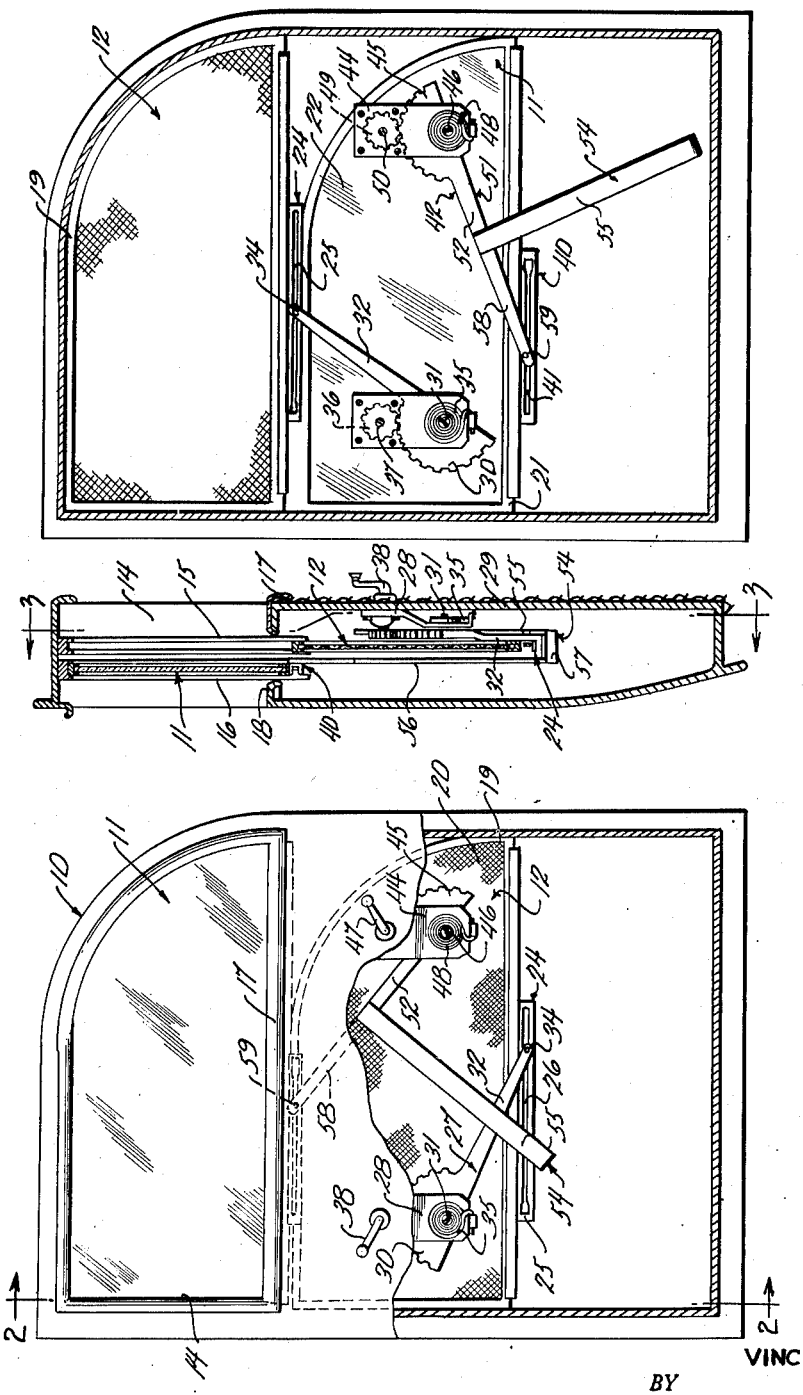

2,591,232

UNITED STATES PATENT OFFICE 2,591,232

WINDOW SCREEN FOR VEHICLES

Vincent C. Brown, Big Stone City, S. Dak.

Application December 23, 1948, Serial No. 66,957

1 Claim. (Cl. 268—126)

This invention relates to an improved window screen device for automobile windows provided with vertically slidable window glasses.

It is an object of this invention to provide an improved window screen and actuating means therefore of the kind to be more particularly described hereinafter, which is mounted for sliding movement in a window frame alongside the window glass therein so that both its operating mechanism and that of the window glass may be contained in the restricted interior space available within the door or body of an automobile or the like.

Another object of this invention is to provide a door for an automobile having a vertically-sliding window glass, a vertically-sliding screen and separate actuating means for the window glass and screen so constructed and arranged that either the window glass or screen may be raised or lowered, independently of each other, handle means being disposed on the inboard side of the door so as to be readily reached by an operator within the vehicle for operating the window glass and screen.

With the above and other objects in view, my invention consists in the arrangement, combination and details of construction disclosed in the drawings and specification, and then more particularly pointed out in the appended claims.

In the drawings:

Figure 1 is a side elevation, partly broken away and partly in section, of the inboard side of an automobile door having incorporated therein window and screen-actuating means constructed according to an embodiment of my invention;

Figure 2 is a vertical, transverse section taken on the line 2—2 of Figure 1;

Figure 3 is a vertical, longitudinal section taken on the line 3—3 of Figure 2.

Referring to the drawings, the numeral 10 designates generally an automobile door having a vertically-slidable window glass 11 and a vertically slidable window screen 12 adapted to be optionally positioned in the opening of the window frame 14. Separate operating means are provided for the window glass 11 and for the screen 12 for independently sliding the window glass 11 and the screen 12 to raised and lowered positions.

The door 10 is hollow and is formed in its upper part with an open window frame, the body of the door being provided internally with a pair of laterally adjacent guide channels 15 and 16 extending along opposite sides of the window frame 14 for guiding the window glass 11 and screen 12, respectively. The sill 17 of the door is formed with a longitudinal opening 18 through which both the window glass 11 and the screen 12 are movable upwardly from depressed positions within the door 10 below the sill 17.

The screen 12 is formed with a frame 19 having a reticulated center portion 20, the frame 19 being slidable vertically in the guide channel 15, shown in the drawings as the innermost of the channels 15 and 16. The window 11 is formed with a peripheral frame 21 having a center solid transparent body 22, and the window frame 21 is slidable vertically in the guide channel 16, disposed outwardly of the guide channel 15 described above. While the screen 12 is positioned inwardly of the window 11 in the drawings, it is to be understood that the screen 12 may be positioned outwardly of the window 11, the change being a matter of choice to be determined by the owner or manufacturer.

The frame 19 of the screen 12 is formed with a longitudinal, U-shaped channel 24 fixed on the lower horizontal edge thereof. The U-shaped channel 24 is disposed with the bight portion thereof vertical on the inner side of the frame 19, having one horizontal arm of the U-shaped channel secured to the lower surface of the lower longitudinal frame member. The bight portion 25 of the channel or guide member 24 is formed with a longitudinally-extending horizontal slot 26 therein extending substantially along the entire length of the guide member 24.

A lever 27 is pivotally mounted on a bracket 28 fixed on the inner panel 29 of the door. The lever 27 includes a gear segment 30 fixed on one end thereof, or preferably formed integrally therewith. The lever 27 is pivotally mounted in the bracket 28 by a pivot pin 31 which extends through the bracket 28 and the radial center of the segment 30. The lever 27 also includes a forwardly-extending arm 32 fixed to or formed integrally with one side of the segment gear 30. The arm 32 is outwardly offset intermediate the length thereof for the purpose to be hereinafter described. The outer end of the arm 32 slidably engages the frame 19 by the engagement of the pin 34 fixed on the free end of the arm 32 and slidably engageable in the slot 27 formed in the guide channel 24. A spring, as 35, is disposed about the pivot pin 31 for substantially balancing the weight of the screen 12 in the door. One end of the spring 35 is fixed to the bracket 28, and the other end of the spring is fixed to the shaft or pivot pin 31. Upon lowering of the screen 12, the spring 35 will be slightly tensioned to assist in raising the frame and substantially balancing the screen in the vertical movement thereof.

A pinion gear 36 is fixed on the shaft 37 which extends through the inner panel 29 of the door. The gear teeth of the pinion 36 engage with the teeth of the segment gear 30 for rocking the lever 32 from a raised to a lowered position. A handle or crank 38 is fixed to or formed on the inner end of the shaft 37 for rotating the pinion gear 36 by the operator within the vehicle.

The window 11 is raised and lowered by a mechanism substantially similar to the mechanism described above for raising and lowering the window screen. A guide channel 40 similar to the guide channel 24 described above is fixed on the lower edge of the window frame 21. The guide channel 40 is U-shaped is cross-section, having one horizontal arm thereof fixed to the lower frame member of the frame 21. The bight portion of the channel 40 is formed with a longitudinally-extending slot 41. A lever, as 42, is pivotally mounted on a bracket 44 fixed to the outer side of the inner door panel 29 at the forward end thereof. The bracket 44 is similar to the bracket 28 described above for the window-screen-actuating member, the bracket 28 being disposed adjacent the rear vertical edge of the door 10. Both the bracket 28 and the bracket 44 are disposed at substantially the same horizontal level within the door.

As the bracket 44 is disposed in substantially the same plane as the bracket 28, the lever 42 is formed for reaching across the window screen frame 19 in the lowered position of the screen, as shown in Figures 1 and 2 of the drawings, in a manner to raise and lower the window 11, irrespective of the relative position of the screen 12.

One end of the lever 42 is formed with an arcuate gear segment 45 pivotally mounted in the bracket 44 by a pivot pin or shaft 46 journaled in the bracket 44. A spring, as 48, is disposed about the shaft 46 in the same manner as the spring 35, described above, one end of the spring 48 being fixed to the bracket 44, the other end of the spring being fixed on the shaft 46. A pinion gear 49 is rotatably mounted in the bracket 44 for engagement with the gear teeth on the segment 45 for rocking the lever 42 on its pivot 46. The gear 49 is fixed on the shaft 50 which extends inwardly of the panel 29 of the door, and carries the crank 47 for operation of the window by an operator.

A substantially horizontal arm 51 is fixed on the gear segment 45 and extends rearwardly of the pivot pin 46 thereof. The arm 51 is formed with a short horizontally-extending arm 52 disposed inwardly of the window and screen frames. A U-shaped bridging member 54 is fixed on the rearmost end of the short arm 52 and is disposed at substantially right angles thereto. One side arm, 55, of the bridging member 54 is fixed to or formed integrally with the free end of the short arm 52 and extends downwardly therefrom. The parallel side arm 56 of the bridging member 54 extends upwardly between the window 11 and screen 12 for engagement with the guide member 41 fixed on the lower side of the frame 21 of the window. The side arms 55 and 56 of the U-shaped bridging member 54 are connected together at their lower ends by a horizontal bight portion 57. The side arm 56 extends upwardly substantially the same length as the side arm 55, and at the extreme upper end of the side arm 56 a rearwardly-extending short arm 58 extends in substantially the same horizontal plane as the short arm 52 described above. The arm 58 is fixed to or formed integrally with the upper end of the side arm 56 of the bridging member 54. The free end of the arm 58 is slidably engaged in the guide member 40 by connection thereto with a pin 59. The pin 59 is fixed on the free end of the arm 58 and slidably engages in the slot 41.

In Figures 1 and 2, the screen 12 is shown in its lowered position, while the window 11 is shown in its fully raised position. In Figure 3, the positions of the window and screen are reversed, and the window 11 is shown in its extreme lowered position, while the screen 12 is shown in its extreme raised position. By the structure of the window and screen-actuating means set forth herein, either of the closures, the window or the screen, may be moved to any selected position, irrespective of the relative position of the overlying closure member. In other words, the window and screen may be raised both at the same time; or both lowered at the same time, and either one may be raised or lowered to its extreme, or intermediate, position, irrespective of the disposition and movement of the other closure member.

In the use and operation of the door 10 described above, when it is desired to raise the screen from its concealed position within the door, the crank 38 may be rotated for pivoting the lever 27 upwardly. The lever 27 engages between the arm 55 of the bridging member 54 and the screen, and is offset intermediate the length thereof to provide a clearance between the side arm 55 and the screen in its lowered position. Upon rotation of the crank 38, the lever 27 will be rocked about the pin 31 from the downwardly-inclined position shown in Figure 1 to the upwardly-inclined position shown in Figure 3.

For raising and lowering the window 11, the crank 47 may be rotated by the operator. Rotation of the shaft 50 and the pinion 49 will effect rotation of the segment gear 45 about its pivot pin 46. The lever 42 carried by the segment gear 45 will be raised from its downwardly and rearwardly-inclined position shown in Figure 3 to its upwardly and rearwardly-inclined position shown in Figure 1. If the screen 12 is in its lowermost position when the window 11 is raised, the bight portion 57 of the bridging member 54 will be moved to a position adjacent the lower edge of the screen frame 19 when the window 11 is moved to its fully-raised position. When the window 11 is down, the bridging member 54 will be disposed considerably below the lower edges of both the window and the screen, so that there will be no interference between the window and the screen when either one is raised while the other is lowered.

I do not mean to confine myself to the exact detailed construction herein disclosed, but claim all variations falling within the purview of the appended claim.

I claim:

In a hollow automobile door formed with a window opening in its upper part having an open frame therein and pairs of laterally spaced vertical guides extending along opposite sides of the window frame, a window glass vertically slidably in one pair of guides, a screen vertically slidable in the other pair of guides, said screen being positioned at one side of said window glass, a first horizontal channel located along and secured to the under side of the screen, a second horizontal channel secured to the under side of said window glass, a first shaft journaled in the door, a first gear segment pivoted on said first shaft having a first rigid arm having a free end engaged in said first channel, a second operating shaft journaled in the door substantially on a level with and at one side of said first operating shaft, a second gear segment pivoted on said second shaft having a second rigid operating arm including a free end slidably engaging said second channel, and operating handles journaled on the door having pinions in mesh with said gear segments, said first and second operating arms reaching toward each other from said first and second shafts, said second operating arm comprising a bridge on its free end reaching across the lower end of the screen and a vertical arm on said bridge constituting the said free end of the second operating arm, said vertical arm extending along the opposite side of the screen from said window glass.

VINCENT C. BROWN.

REFERENCES CITED

The following references are of record in the file of this patent:

UNITED STATES PATENTS

| Number | Name | Date |
|---|---|---|
| 1,683,459 | Hanson | Sept. 4, 1928 |
| 1,722,481 | Ragsdale | July 30, 1929 |
| 1,840,753 | Thurne | Jan. 12, 1932 |
| 1,870,400 | Butterfass | Aug. 9, 1932 |